US008219164B2

(12) United States Patent
Cho et al.

(10) Patent No.: US 8,219,164 B2

(45) Date of Patent: Jul. 10, 2012

(54) APPARATUS AND METHOD FOR SUPPORTING MULTIPLE ANTENNA SERVICE IN A WIRELESS COMMUNICATION SYSTEM

(75) Inventors: Myeon-Kyun Cho, Seongnam-si (KR); In-Soo Hwang, Yongin-si (KR); Eun-Seok Ko, Suwon-si (KR); Young-Ho Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 883 days.

(21) Appl. No.: 12/183,023

(22) Filed: Jul. 30, 2008

(65) Prior Publication Data

US 2009/0036183 A1 Feb. 5, 2009

(30) Foreign Application Priority Data

Jul. 31, 2007 (KR) ........................ 10-2007-0076763

(51) Int. Cl.

*H04B 7/08* (2006.01)
*H04B 7/00* (2006.01)
*H04M 1/00* (2006.01)

(52) U.S. Cl. .................. 455/575.7; 455/575.1; 455/132; 455/509; 455/550.1; 455/553.1

(58) Field of Classification Search ................. 455/90.3, 455/101, 132, 140, 143, 425, 509, 553.1, 455/550.1, 561, 562.1, 575.1, 575.7; 370/329, 370/334, 341, 431

See application file for complete search history.

(56) References Cited

U.S. PATENT DOCUMENTS 7,062,295 B2 * 6/2006 Yoshii et al. ............... 455/562.1
7,251,460 B2 * 7/2007 Khatri ........................... 455/101
2006/0046662 A1 * 3/2006 Moulsley et al. ............... 455/69
2009/0213765 A1 * 8/2009 Rinne et al. .................... 370/278
2009/0316801 A1 * 12/2009 Nitta et al. .................... 375/260

FOREIGN PATENT DOCUMENTS

WO 2006/048711 A1 5/2006
WO WO2006137282 A1 * 12/2006

* cited by examiner

*Primary Examiner* — Wesley Kim

(74) *Attorney, Agent, or Firm* — Jefferson IP Law, LLP

(57) ABSTRACT

An apparatus and method for supporting a multiple antenna service in a wireless communication system are provided. The apparatus includes at least one antenna, a form determining unit for determining a form of an MS, and an antenna constructing unit for constructing an antenna structure according to the form of the MS using the at least one antenna.

7 Claims, 5 Drawing Sheets

APPARATUS AND METHOD FOR SUPPORTING MULTIPLE ANTENNA SERVICE IN A WIRELESS COMMUNICATION SYSTEM

PRIORITY

This application claims the benefit under 35 U.S.C. §119 (a) of a Korean patent application filed in the Korean Intellectual Property Office on Jul. 31, 2007 and assigned Serial No. 2007-76763, the entire disclosure of which is hereby incorporated by reference.

BACKGROUND OF THE INVENTION

1. Field of the Invention

The present invention relates to an apparatus and method for supporting a multiple antenna service in a wireless communication system. More particularly the present invention relates to an apparatus and method for supporting an adaptive multiple antenna service for adapting an antenna structure of a Mobile Station (MS) in a wireless communication system.

2. Description of the Related Art

Due to the rapid growth of the wireless mobile communication market, there is a demand for a variety of wireless multimedia services. Recent advancements make it possible to provide the multimedia services by transmitting large amounts of data at a high speed. However, while there is an increasing demand for the multimedia services, there are only limited frequency resources with which to provide those services. Accordingly, research on a multiple antenna system (e.g., a Multiple Input Multiple Output (MIMO) system) is being conducted to more efficiently utilize the limited frequency resources.

The multiple antenna system transmits data using channels that are independent from each other on an antenna by antenna basis. Thereby, the multiple antenna system can increase transmission reliability and a data rate compared to a single antenna system without allocating additional frequencies or transmission power.

The multiple antenna system utilizes a different transmission/reception method depending on if it is supporting a single user or multiple users. In addition, the transmission/reception method is different depending on if a transmitting end of the multiple antenna system recognizes channel information for a receiving end.

In order to provide a multiple antenna service in a wireless communication system, a transmitting end and a receiving end include multiple antennas. The multiple antennas have to maintain more than a constant distance (e.g., $\lambda$ (wavelength length)/4). That is, when the transmitting/receiving ends include multiple antennas and the multiple antennas have the same signal incident angles and positions as the signal distributors, the multiple antennas experience poor performance as a result of interference between the antennas, if the antennas are positioned too close to each other to achieve a space correlation between the antennas. Thus, when the multiple antennas are provided in the wireless communication system, each antenna has to maintain more than a minimum distance from the other antenna.

However, a Mobile Station (MS) of the wireless communication system is constructed to be small for easy portability. Thus, when the MS has multiple antennas, there is a problem in that the MS experiences poor performance due to interference between the antennas since the MS cannot provide a sufficient distance for a space correlation between the multiple antennas.

SUMMARY OF THE INVENTION

An aspect of the present invention is to address at least the above-mentioned problems and/or disadvantages and to provide at least the advantages described below. Accordingly, an aspect of the present invention is to provide an apparatus and method for satisfying a distance required for a space correlation between antennas when multiple antennas are used in a Mobile Station (MS) of a wireless communication system.

Another aspect of the present invention is to provide an apparatus and method for supporting an adaptive multiple antenna service based on a change of an antenna structure of an MS of a wireless communication system.

A further aspect of the present invention is to provide an apparatus and method for supporting an adaptive multiple antenna service based on a change of an antenna structure of an MS of a wireless communication system and a change of a user's Quality of Service (QoS).

The above aspects are addressed by providing an apparatus and method for supporting a multiple antenna service in a wireless communication system.

According to one aspect of the present invention, a Mobile Station (MS) apparatus of a wireless communication system is provided. The apparatus includes at least one antenna, a form determining unit for determining a form of an MS, and an antenna constructing unit for constructing an antenna structure according to the form of the MS using the at least one antenna.

According to another aspect of the present invention, a method for providing a multiple antenna service in an MS of a wireless communication system is provided. The method includes constructing an antenna structure according to a form of the MS when the form of the MS changes, and transmitting information on the antenna structure to a Base Station (BS).

According to a further aspect of the present invention, a method for providing a multiple antenna service in a Base Station (BS) of a wireless communication system is provided. The method includes determining antenna structure information of a Mobile Station (MS) in a signal received from the MS, determining a channel environment of the MS according to the antenna structure information of the MS, and performing scheduling for the MS in consideration of the channel environment.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A technology for changing an antenna structure of a Mobile Station (MS) to provide a multiple antenna service in a wireless communication system is described below.

Figures 1A, 1B, 1C:
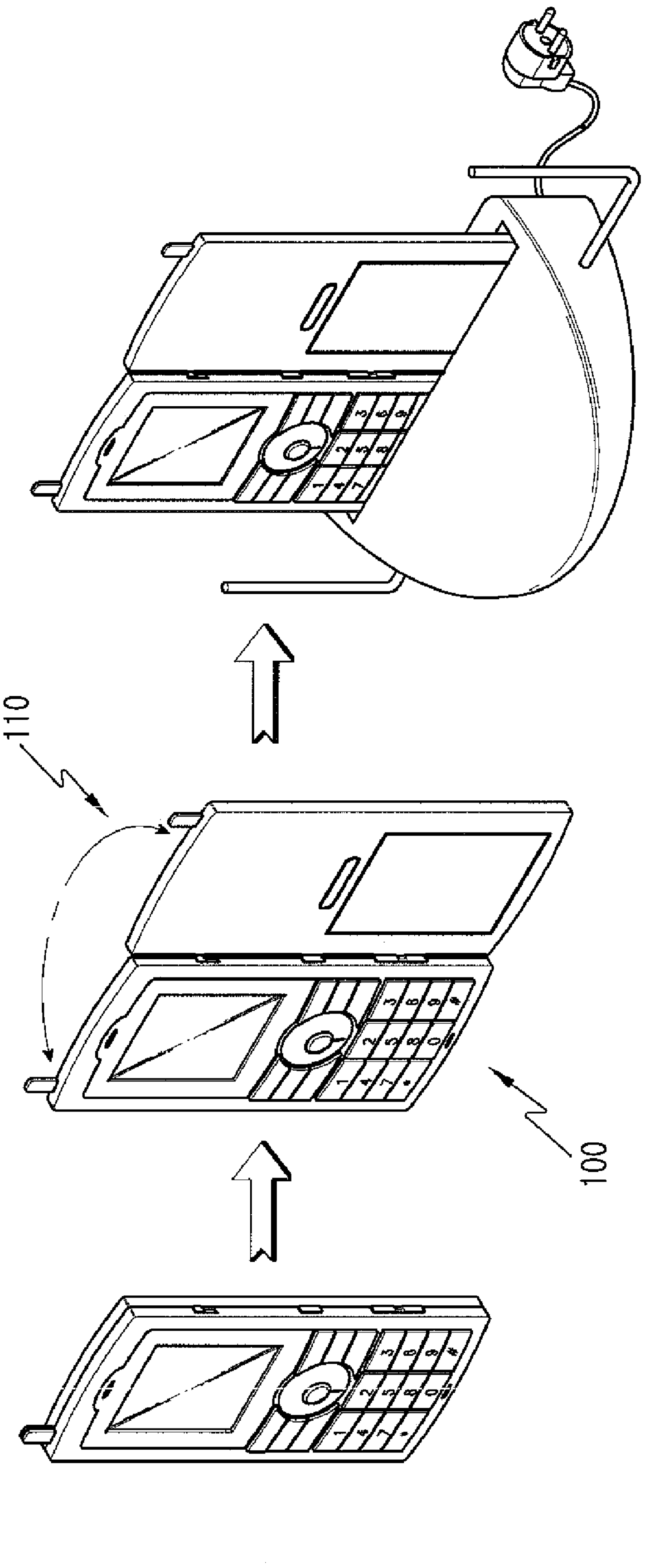
FIGS. 1A, 1B and 1C are diagrams illustrating an antenna structure of a Mobile Station (MS) in a wireless communication system according to an exemplary embodiment of the present invention.

In the wireless communication system, an MS can have multiple antennas, as shown in FIGS. 1A, 1B and 1C, by changing its form and providing a distance that can establish a space correlation between antennas. As an example, a description is made of the MS changing an antenna structure depending on its folded state and unfolded state. However, the present invention is equally applicable to an MS changing into a different form in such a manner that the MS extends by dividing into an internal device block and an external device block or extends by adding a separate device, or an MS of a thin roll type extends in size as being unrolled.

FIGS. 1A, 1B and 1C are diagrams illustrating an antenna structure of an MS in a wireless communication system according to an exemplary embodiment of the present invention.

In FIGS. 1A, 1B and 1C, the MS changes its form and provides a distance that can satisfy a space correlation between antennas. For example, for better mobility, the MS maintains a folded state as illustrated in FIG. 1A. However, the MS of the folded state cannot provide a distance required for a space correlation between antennas and therefore, has a single antenna.

When the MS requires a higher data rate or an increased reliability over that achieved using a single antenna, the MS is unfolded and provides two antennas as illustrated in FIG. 1B when the MS is unfolded, that is, sub body(110) is opened with respect to main body(100), the distance between a antenna radiator of the main body(100) and that of the sub body(110) satisfies space correlation. Thereby, the MS can have two antennas.

In FIG. 1C, the MS can have a supplementary antenna using a charger or a base unit in an unfolded state. Here, the MS can have four antennas.

As described above, in the wireless communication system, an MS can change its form such that the MS can have multiple antennas. However, even if the MS changes in form and its antenna structure changes, a communication environment of the MS may vary. Thus, the MS transmits antenna structure change information to a Base Station (BS) so that the BS can perform scheduling in consideration of the communication environment according to the antenna structure of the MS.

Figure 2:
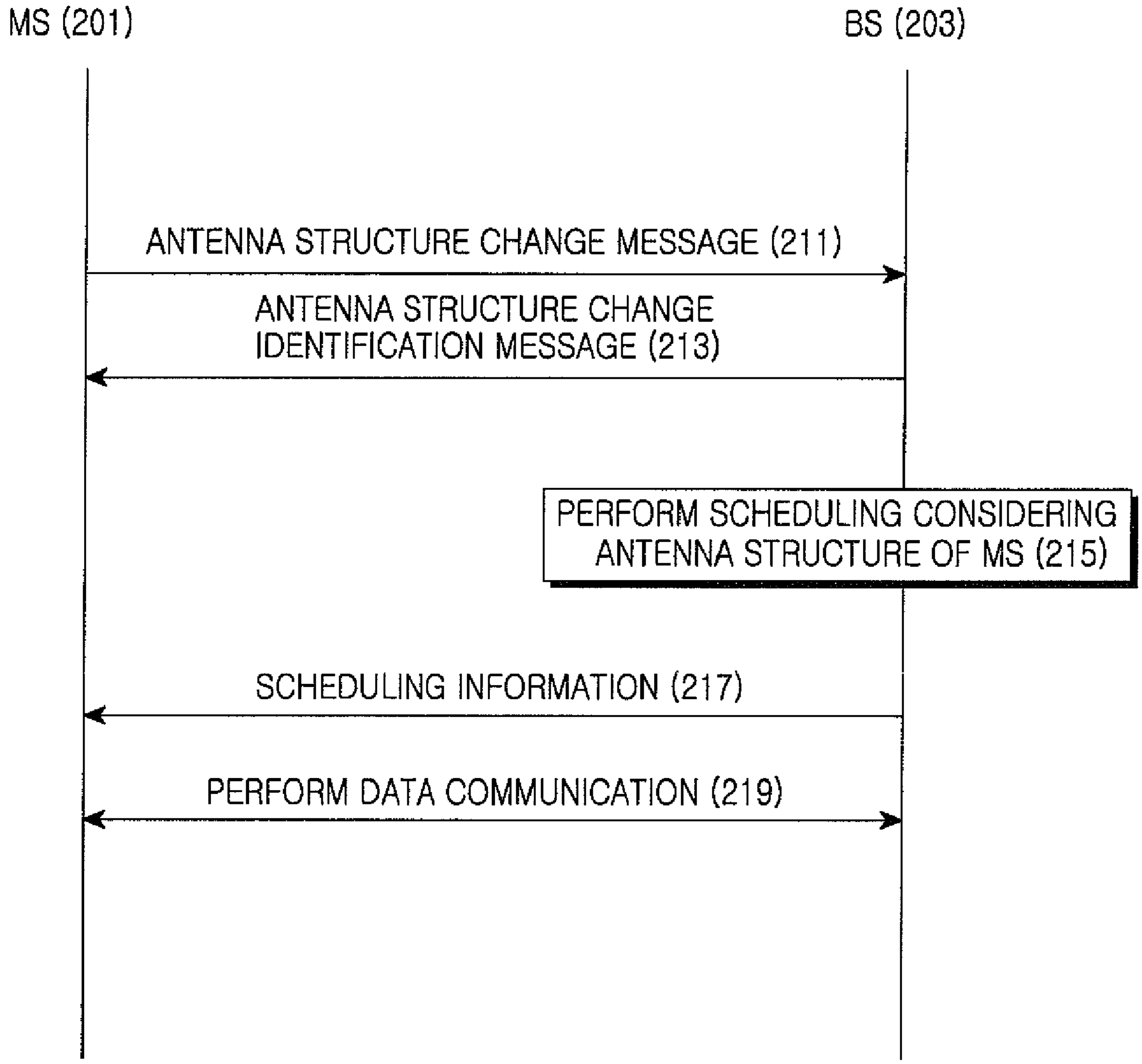
FIG. 2 is a flow diagram illustrating a process of providing a multiple antenna service with respect to an antenna structure of an MS in a wireless communication system according to an exemplary embodiment of the present invention.

FIG. 2 is a flow diagram illustrating a process of providing a multiple antenna service with respect to an antenna structure of an MS in a wireless communication system according to an exemplary embodiment of the present invention.

Referring to FIG. 2, if an MS 201 changes its form and its antenna structure changes, the MS 201 sends an antenna structure change message to a BS 203 in step 211.

If the antenna structure change message is received from the MS 201, the BS 203 sends an antenna structure change identification message to the MS 201 in step 213.

Thereafter, in step 215, the BS 203 performs scheduling for the MS 201 according to the changed antenna structure of the MS 201 that is confirmed through the antenna structure change message. That is, the BS 203 expects a Quality of Service (QoS) of the MS 201 in accordance with the changed antenna structure of the MS 201. Then, the BS 203 selects a multiple antenna service in accordance with the QoS of the MS 201 and performs scheduling for the MS 201. For example, when the MS 201 has a single antenna as shown in FIG. 1A, the BS 203 determines that the MS 201 is mobile and needs to be provided with a service having sufficient reception performance for the MS's single antenna.

When the MS 201 has two antennas as shown in FIG. 1B, the BS 203 determines that the MS 201 requires a high data rate and increased reliability, compared to when the MS is using a single antenna. Also, the BS 203 determines that the MS 201 will not experience a high degree of mobility and thus has a channel state that is robust against feedback delay and error.

When the MS 201 has four antennas as shown in FIG. 1C, the BS 203 determines that the MS is stationary and requires a maximum data rate.

In step 217, the BS 203 transmits to the MS 201 scheduling information in consideration of an antenna structure of the MS 201.

Then, in step 219, the MS 201 communicates with the BS 203 in accordance with the scheduling information.

In the aforementioned exemplary embodiment of the present invention, the MS 201 sends the antenna structure change message to the BS 203 when an antenna structure is changed through a change of its form. In another exemplary embodiment of the present invention, the MS 201 can also transmit antenna structure information to the BS 203 periodically.

An operational method of an MS for providing a multiple antenna service according to an antenna structure of the MS is described below.

Figure 3:
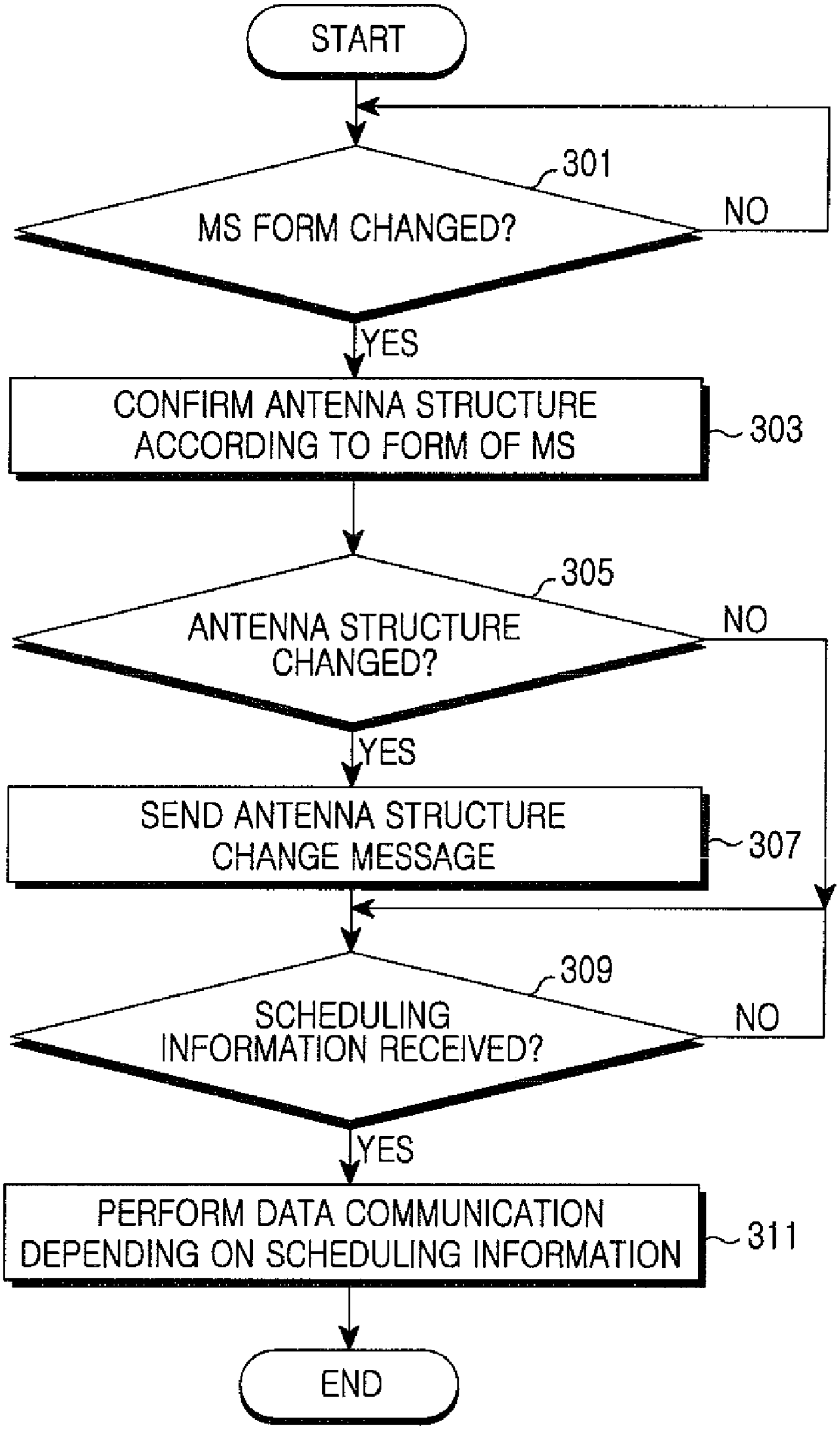
FIG. 3 is a flow diagram illustrating a process of providing a multiple antenna service with respect to an antenna structure of an MS in a wireless communication system according to an exemplary embodiment of the present invention.

FIG. 3 is a flow diagram illustrating a process of providing a multiple antenna service with respect to an antenna structure of an MS in a wireless communication system according to an exemplary embodiment of the present invention. The following example an MS sends an antenna structure change message to a BS when a change of antenna structure occurs.

Referring to FIG. 3, in step 301, an MS confirms if its form changes.

If the MS form changes, the MS confirms an antenna structure according to the changed MS form in step 303. For example, if an MS is folded as shown in FIG. 1A, the MS has a single antenna structure. If an MS is unfolded as shown in FIG. 1B, the MS has a two-antenna structure. If an MS is in a charging mode in an unfolded state or is disposed in a base unit in an unfolded state as shown in FIG. 1C, the MS has a four-antenna structure.

Then, in step 305, the MS confirms if its antenna structure changed when the MS form changed.

If the antenna structure changed in step 305, the MS sends an antenna structure change message to a BS in step 307. Then, although not specifically shown, the MS confirms if it receives an identification message from the BS in response to the antenna structure change message. That is, the MS confirms if the antenna structure change message has been sent without an error, through the identification message. Thus, if the identification message is not received in response to the antenna structure change message during a preset time, the MS can again send the antenna structure change message to the BS.

Then, the MS confirms if it receives the scheduling information from the BS in step 309.

If the antenna structure does not change in step 305, the MS can also confirm if it receives scheduling information in step 309.

If the scheduling information is received, the MS communicates with the BS in accordance with the scheduling information in step 311.

Then, the MS terminates the process of an exemplary embodiment of the present invention.

An operational method of a BS for providing a multiple antenna service according to an antenna structure of an MS is described below.

Figure 4:
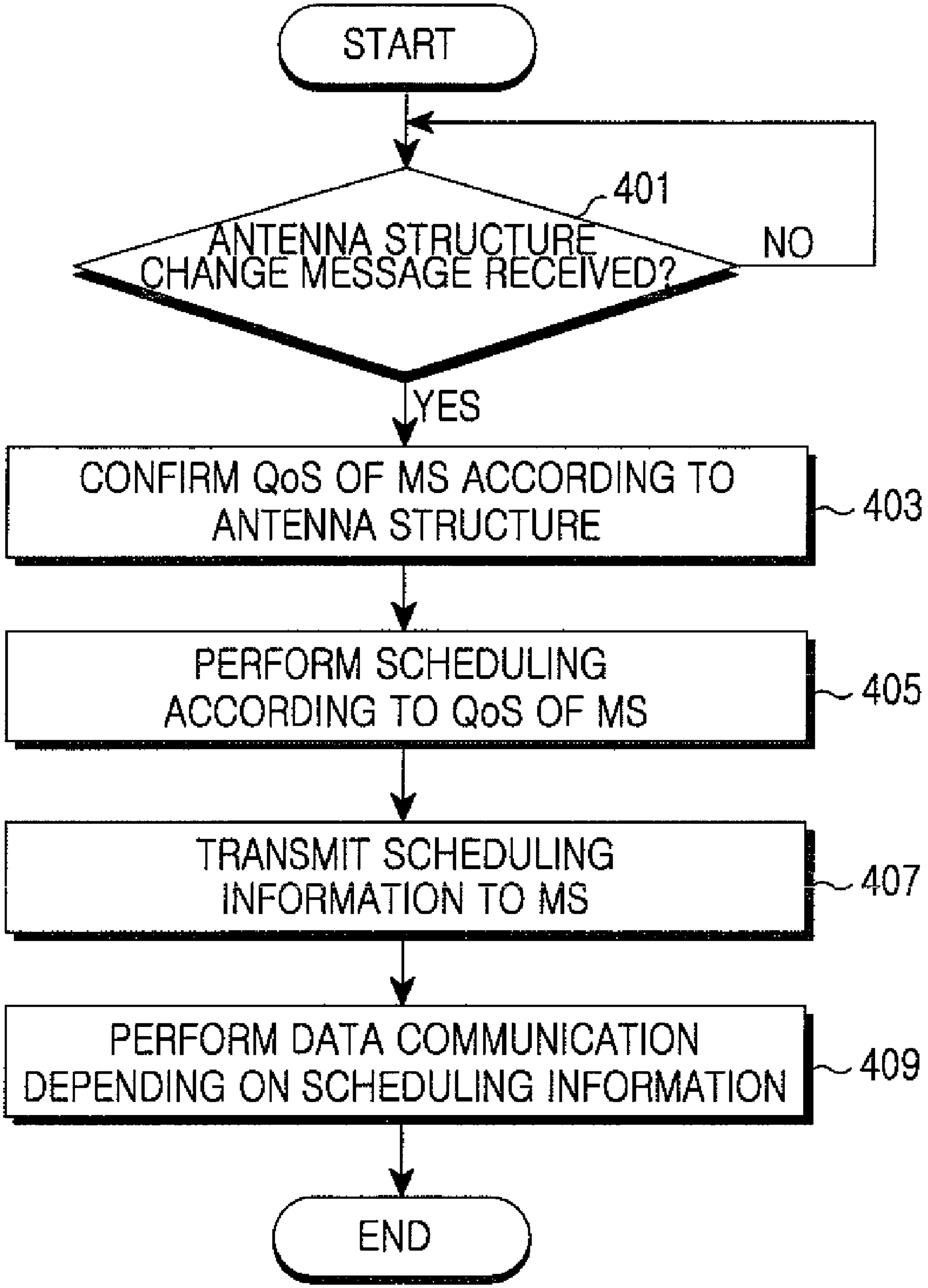
FIG. 4 is a flow diagram illustrating a process of providing a multiple antenna service with respect to an antenna structure of an MS in a Base Station (BS) of a wireless communication system according to an exemplary embodiment of the present invention.

FIG. 4 is a flow diagram illustrating a process of providing a multiple antenna service with respect to an antenna structure of an MS in a BS of a wireless communication system according to an exemplary embodiment of the present invention.

Referring to FIG. 4, in step 401, a BS confirms if it receives an antenna structure change message from an MS.

If the antenna structure change message is received, in step 403, the BS confirms a QoS of the MS according to an antenna structure of the MS that is confirmed through the antenna structure change message. For example, when the MS has a single antenna, the BS determines that the MS is mobile and is provided with a service having sufficient reception performance for the single antenna. When the MS has two antennas, the BS determines that the MS requires a high data rate and increased reliability compared to when the MS is using a single antenna. Also, the BS determines that the MS will not experience a high degree of mobility and thus has a channel state that is robust against feedback delay and error. When the MS has four antennas, the BS determines that the MS is stationary and requires a maximum data rate. Although not specifically shown, when the antenna structure change message is received, the BS confirms if there is an error in the antenna structure change message. Then, the BS sends an identification message to the MS in response to the antenna structure change message when there is no error in the antenna structure change message.

After the QoS of the MS is confirmed in step 403, the BS performs scheduling according to the QoS of the MS in step 405. That is, the BS selects one of an open loop scheme and a close loop scheme depending on the QoS of the MS. When the close loop scheme is selected, the BS further selects a multiple antenna service in accordance with a single user or multiple user environments. The BS selects the multiple antenna service taking into consideration a mobility of the MS. As described above, the BS selects a multiple antenna service for the MS and performs scheduling.

After performing the scheduling according to the QoS of the MS, the BS transmits the scheduling information to the MS in step 407.

After transmitting the scheduling information, the BS communicates with the MS depending on the scheduling information in step 409.

Then, the BS terminates the process of an exemplary embodiment of the present invention.

In the aforementioned exemplary embodiment of the present invention, an MS transmits antenna structure information to a BS. Thus, the BS performs scheduling for the MS according to a channel environment of the MS that is estimated by considering only the antenna structure information of the MS.

In another exemplary embodiment of the present invention, an MS can also transmit the antenna structure information and speed information to a BS. Thereby, the BS can more accurately estimate the MS channel environment using the antenna structure information and speed information of the MS. Thus, the BS can select a multiple antenna service depending on more accurate MS channel environment information. For example, when the MS is moving at a relatively high speed, an open loop technique is used and therefore, the BS selects a Space Time Transmit Diversity (STTD) technique. When the MS is moving at a relatively low speed, the BS selects one of an open loop, close loop, and dirty paper scheme using an antenna structure of the MS, a Signal to Interference and Noise Ratio (SINR) and movement information of the MS. That is, when the MS has two antennas but has a low SINR and a high mobility, the BS performs scheduling for the MS to operate depending on a rank. For example, an STTD scheme may be selected for a rank of 1 and a Spatial Multiplexing (SM) scheme may be selected for a rank of 2.

When the MS has a good channel quality by virtue of a high SINR and a low mobility, the BS may use a zero forcing beamforming or block diagonalization technique such as a dirty paper coding series having low complexity.

When there is a plurality of users, the BS may use a multiple user multiple antenna technique, such as a Per User Unitary feedback/beamforming and Rate Control (PU2RC) series.

Construction of an MS that can change an antenna structure according to a form of the MS is described below.

Figure 5:
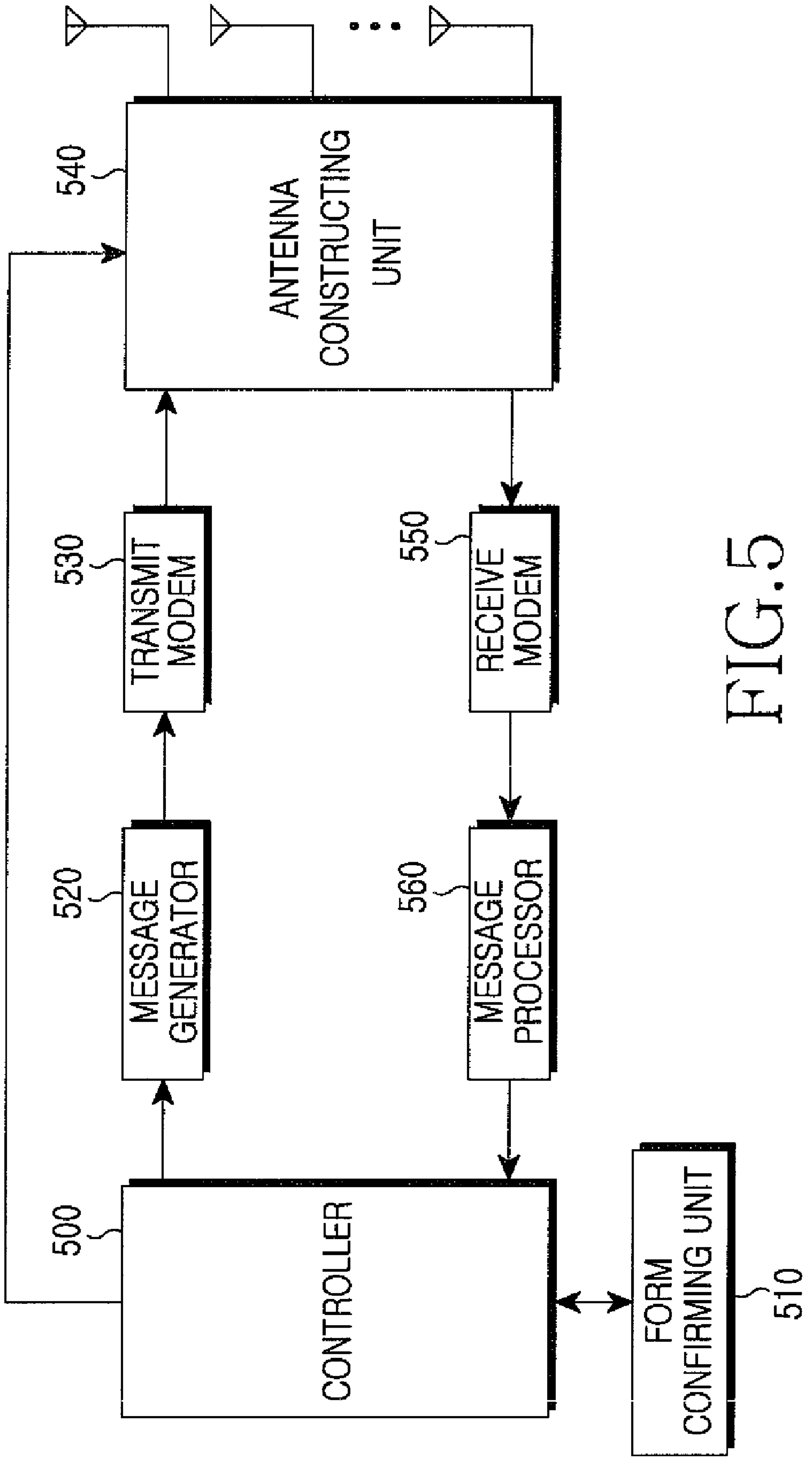
FIG. 5 is a block diagram illustrating a construction of an MS for changing an antenna structure in a wireless communication system according to an exemplary embodiment of the present invention.

FIG. 5 is a block diagram illustrating a construction of an MS for changing an antenna structure in a wireless communication system according to an exemplary embodiment of the present invention.

As shown in FIG. 5, the MS includes a controller 500, a form confirming unit 510, a message generator 520, a transmit MOdulator/DEMoudlator (MODEM) 530, an antenna constructing unit 540, a receive MODEM 550, and a message processor 560.

The controller 500 confirms a form of the MS according to information received from the form confirming unit 510. Then, the controller 500 selects a number of antennas to be used to satisfy a space correlation between antennas depending on the form of the MS and controls the antenna constructing unit 540.

The controller 500 controls the transmit MODEM 530 and the receive MODEM 550 to operate depending on scheduling information that is received from a BS based on the antenna structure of the MS.

When the antenna structure changes, the controller 500 controls the message generator 520 to generate an antenna structure change message for informing a BS of antenna structure change information. The controller 500 controls the message generator 520 to generate the antenna structure change message only when the antenna structure changes. In another exemplary embodiment of the present invention, the controller 500 can also control the message generator 520 to periodically generate an antenna structure change message.

The form confirming unit 510 confirms a form of the MS and provides the form information to the controller 500. As an example, the form confirming unit 510 confirms whether sub body is opened with respect to the main body. The form confirming unit 510 may confirm the form of the MS continuously, periodically or upon a detection of a change of form of the MS. The form confirming unit 510 may detect a change of form of the MS or a separate form detector (not shown) may be used to detect the change of form of the MS.

The message generator 520 generates a message to be sent to a BS under control of the controller 500. For example, the message generator 520 may generate a message including antenna structure information under control of the controller 500. The message generator 520 may generate an antenna structure change message only when the antenna structure changes. In another exemplary embodiment of the present invention, the message generator 520 periodically generates the antennas structure change message.

The transmit MODEM 530 includes a channel code block, a modulation block, a Radio Frequency (RF) transmit block, etc. The transmit MODEM 530 converts a message received from the message generator 520 or transmission data into a transmission format through radio resources and forwards the message or transmission data to the antenna constructing unit 540.

The antenna constructing unit 540 constructs an antenna structure in consideration of a form of the MS under control of the controller 500. For example, when an MS is folded as shown in FIG. 1A, the antenna constructing unit 540 constructs an antenna structure such that the MS operates using one antenna under control of the controller 500. When an MS is unfolded as shown in FIG. 1B, the antenna constructing unit 540 constructs an antenna structure such that the MS operates by two antennas under control of the controller 500. When an MS is disposed in a charger or base unit in an unfolded state as shown in FIG. 1C, the antenna constructing unit 540 constructs an antenna structure such that the MS operates by four antennas under control of the controller 500.

The receive MODEM 550 includes an RF receive block, a demodulation block, a channel decode block, etc. The receive MODEM 550 restores data from a signal received from the antenna constructing unit 540 and forwards the data to the message processor 560. The RF receive block can include a filter, an RF preprocessor, etc. The demodulation block can include a Fast Fourier Transform (FFT) operator for extracting data loaded on each subcarrier, etc. The channel decode block can include a demodulator, a deinterleaver, a channel decoder, etc.

The message processor 560 analyzes a signal received from the receive MODEM 550 and provides the result of the analysis to the controller 500. For example, the message processor 560 provides scheduling information received from the BS, to the controller 500. Depending on the scheduling information, the controller 500 controls the transmit MODEM 530 or the receive MODEM 550.

In the aforementioned construction, the controller 500, which may be a protocol controller, controls the form confirming unit 510, the message generator 520, and the message processor 560. That is, the controller 500 can perform any of the functions of the form confirming unit 510, the message generator 520, and the message processor 560. These are separately constructed and shown in order to distinguish and describe respective functions in the exemplary embodiments of the present invention. Thus, in actual realization, the controller 500 can be constructed to process all these functions. Alternately, the controller 500 can be constructed to process only part of the functions. As described above, exemplary embodiments of the present invention have an advantage of, by providing an adaptive multiple antenna service to an antenna structure of an MS in a wireless communication system and a change of a user's QoS, being able to increase a transmission reliability and a data rate through multiple antennas provided according to a change of a form of the MS, and satisfy a degree of user's satisfaction through an adaptive multiple antenna service provided according to a user's desired QoS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a multiple antenna service in a Base Station (BS) of a wireless communication system, the method comprising:

confirming antenna structure information of a Mobile Station (MS) in a signal received from the MS;

confirming a channel environment of the MS according to the antenna structure information of the MS; and performing scheduling for the MS in consideration of the channel environment, wherein the channel environment confirmed by the BS comprises Quality of Service (QoS) information of the MS, wherein the antenna structure information of the MS is transmitted to the BS from the MS after a change in the antenna structure information, and wherein the change in the antenna structure information corresponds to a change in a physical shape of the MS and a change in a number of antennas physically connected to the MS.

2. The method of claim 1, wherein the antenna structure information comprises at least one of the number of available antenna of the MS and a speed of movement of the MS.

3. The method of claim 2, the available antenna satisfies space correlation between antennas.

4. The method of claim 1, wherein the channel environment comprises QoS information of the MS considering at least one of the number of available antenna of the MS and a speed of movement of the MS.

5. The method of claim 1, wherein the performing of the scheduling comprises:

selecting a multiple antenna service to be provided to the MS in consideration of the channel environment; and performing the scheduling for the MS in consideration of the multiple antenna service.

6. The method of claim 5, wherein the multiple antenna service comprises a service using at least one of an open loop technique, a close loop technique, a zero forcing beamforming technique, a Spatial Multiplexing (SM) technique, a block diagonalization technique, a Space Time Transmit Diversity (STTD) technique, a dirty paper coding technique, and a Per User Unitary feedback/beamforming and Rate Control (PU2RC) technique.

7. The method of claim 1, further comprising:

transmitting the scheduling information to the MS; and communicating with the MS depending on the scheduling information.

* * * * *